United States Patent
Ricco et al.

(10) Patent No.: US 11,669,977 B2
(45) Date of Patent: *Jun. 6, 2023

(54) PROCESSING IMAGES TO LOCALIZE NOVEL OBJECTS

(71) Applicant: Google LLC, Mountain View, CA (US)

(72) Inventors: Susanna Maria Ricco, Redwood City, CA (US); Bryan Andrew Seybold, San Francisco, CA (US)

(73) Assignee: Google LLC, Mountain View, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/214,327

(22) Filed: Mar. 26, 2021

(65) Prior Publication Data

US 2021/0217197 A1    Jul. 15, 2021

Related U.S. Application Data

(63) Continuation of application No. 16/264,222, filed on Jan. 31, 2019, now Pat. No. 10,991,122.

(Continued)

(51) Int. Cl.
*G06T 7/73* (2017.01)
*G06T 7/215* (2017.01)
(Continued)

(52) U.S. Cl.
CPC .............. *G06T 7/215* (2017.01); *G06T 7/248* (2017.01); *G06T 7/74* (2017.01); *G06V 10/764* (2022.01);
(Continued)

(58) Field of Classification Search
CPC . G06T 7/74; G06T 7/248; G06T 2207/10016; G06T 2207/20081;
(Continued)

(56) References Cited

U.S. PATENT DOCUMENTS 10,991,122 B2 * 4/2021 Ricco .................... G06K 9/627
2017/0154212 A1 6/2017 Feris et al.
(Continued)

FOREIGN PATENT DOCUMENTS

CN 108171222 6/2018
CN 108229282 6/2018

OTHER PUBLICATIONS

'davischallenge.org' [online] "DAVIS: Densely Annotated Video Segmentation," Available on or before Jan. 20, 2017 [retrieved on Jan. 22, 2019] Retrieved from Internet: URL<https://davischallenge.org/> 3 pages.

(Continued)

*Primary Examiner* — Phuoc Tran
(74) *Attorney, Agent, or Firm* — Fish & Richardson P.C.

(57) ABSTRACT

Methods, systems, and apparatus, including computer programs encoded on a computer storage medium, for training an optical flow object localization system and a novel object localization system. In a first aspect, the optical flow object localization system is trained to process an optical flow image to generate object localization data defining locations of objects depicted in a video frame corresponding to the optical flow image. In a second aspect, a novel object localization system is trained to process a video frame to generate object localization data defining locations of novel objects depicted in the video frame.

20 Claims, 4 Drawing Sheets

Related U.S. Application Data

(60) Provisional application No. 62/760,594, filed on Nov. 13, 2018.

(51) Int. Cl.
  *G06T 7/246* (2017.01)
  *G06V 10/764* (2022.01)
  *G06V 20/40* (2022.01)

(52) U.S. Cl.
  CPC .... *G06V 20/40* (2022.01); *G06T 2207/10016* (2013.01); *G06T 2207/20081* (2013.01); *G06T 2207/20084* (2013.01)

(58) Field of Classification Search
  CPC ........... G06T 2207/20084; G06T 7/215; G06T 7/269; G06T 7/70; G06V 10/764; G06V 20/40; G06K 9/627
  See application file for complete search history.

(56) References Cited

U.S. PATENT DOCUMENTS

2017/0293805 A1  10/2017  Kontschieder et al.
2020/0074642 A1  3/2020   Wilson et al.

OTHER PUBLICATIONS

Fragkiadaki et al. "Learning to Segment Moving Object in Videos," Proceedings of the IEEE Conference on Computer Vision and Pattern Recognition, Jun. 2015, 8 pages.

Li et al. "Instance Embedding Transfer to Unsupervised Video Object Segmentation," arXiv 1801.00908v2, Feb. 27, 2018, 14 pages.

Ochs et al. "Segmentation of moving object by long term video analysis," IEEE Transaction on Pattern Analysis and Machine Intelligence, 36(6), Jun. 2014, 14 pages.

PCT International Search Report and Written Opinion in International Appln. No. PCT/US2019/047016, dated Nov. 28, 2019, 16 pages.

Simonyan et al., "Two-Stream Convolution Networks for Action Recognition in Videos," NIPS, Jun. 2014, 9 pages.

Stroud et al., "D3D: Distilled 3D Networks for Video Action Recognition," arXiv: 1812.08249v2, Dec. 2018, 13 pages.

Tokmakov et al. "Learning Video Object Segmentation with visual memory," arXiv 1704.05737, Jul. 12, 2017, 11 pages.

Wang et al., "Actionness Estimation Using Hybrid Fully Convolutional Networks," IEEE Conference on Computer Vision and Pattern Recognition, Jun. 2016, 2708-2717.

Xie et al., "Rethinking Spatiotemporal Feature Learning: Speed-Accuracy Trade-offs in Video Classification," Intelligent Virtual Agent, Oct. 2018, 318-335.

EP Office Action in European Application No. 1976313 5.1, dated Jul. 21, 2021, 5 pages.

PCT International Preliminary Report on Patentability in International Application No. PT/US2019/047016, dated May 27, 2021, 10 pages.

CN Office Action in Chinese Application No. 201980074876.1, dated Sep. 1, 2021, 16 pages (with English translation).

* cited by examiner

PROCESSING IMAGES TO LOCALIZE NOVEL OBJECTS

CROSS-REFERENCE TO RELATED APPLICATIONS

This patent application is a continuation (and claims the benefit of priority under 35 USC 120) of U.S. patent application Ser. No. 16/264,222, filed Jan. 31, 2019, which claims the benefit under 35 U.S.C. § 119(e) of U.S. Patent Application No. 62/760,594, filed Nov. 13, 2018. The disclosure of the foregoing applications is incorporated herein by reference in its entirety for all purposes.

BACKGROUND

This specification relates to image processing.

An object localization system is a system having multiple trainable parameters that is configured to process an image to localize (i.e., identify the locations of) objects depicted in the image. An object localization system can be trained using a set of training examples, where each training example includes: (i) a training image, and (ii) training object localization data defining the locations of objects depicted in the training image.

SUMMARY

This specification describes training systems implemented as computer programs on one or more computers in one or more locations that can be used to train object localization systems.

According to a first aspect there is provided a method performed by one or more data processing apparatus, the method comprising: for each video frame of a video comprising a plurality of video frames, obtaining object localization data defining locations of objects depicted in the video frame; processing the video to generate, for each video frame of the plurality of video frames, a corresponding optical flow image characterizing a displacement of each pixel of the video frame between the video frame and a subsequent video frame in the video; and using: (i) the optical flow images, and (ii) the object localization data defining the locations of objects depicted in the plurality of video frames corresponding to the optical flow images, training an optical flow object localization system to process an optical flow image to generate object localization data defining locations of objects depicted in a video frame corresponding to the optical flow image.

In some implementations obtaining object localization data defining locations of objects depicted in the video frame may comprise processing the video frame using a known object localization system. The known object localization system may be a previously trained object localization system. For example the known object localization system may be configured to process the video frame to generate data defining locations of objects depicted in the video frame that are from a predetermined set of object classes. In some implementations the known object localization system may comprise a neural network.

Additionally or alternatively obtaining object localization data defining locations of objects depicted in the video frame may comprise obtaining object localization data defining locations of objects depicted in the video frame which is manually annotated by a person. The object localization data defining locations of objects depicted in the video frame may comprise data defining bounding boxes around locations of objects depicted in the video frame. More generally the object localization data may comprise data defining coordinates of the corners of a shape bounding a located object.

Processing the video to generate, for each video frame of the plurality of video frames, a corresponding optical flow image may comprise processing the video using a direct numerical optimization method to generate, for each video frame of the plurality of video frames, the corresponding optical flow image. The direct numerical optimization method may be a method which fits an optical flow field to pixel data from the video frames, e.g. using local space/time derivatives or by region-matching, in either the time or the frequency domain. Additionally or alternatively the optical flow object localization system may comprise a neural network.

The method may further comprise disregarding object localization data which has been generated for objects which are stationary or which have less than a threshold degree of movement with respect to their background. Thus the method may further comprise, for each object location defined by the object localization data for the video frame corresponding to the optical flow image, determining a respective variance of optical flow data in the optical flow image at (over) the object location. The method may then modify the object localization data used to train the optical flow object localization system by removing data defining object locations where the variance of the optical flow data in the optical flow image at the object location does not satisfy a (minimum) threshold.

In another aspect a method performed by one or more data processing apparatus, the method comprises processing a video comprising a plurality of video frames to generate, for each video frame of the plurality of video frames, a corresponding optical flow image characterizing a displacement of each pixel of the video frame between the video frame and a subsequent video frame in the video; for each optical flow image, processing the optical flow image using an optical flow object localization system to generate object localization data defining locations of objects depicted in the video frame corresponding to the optical flow image; and using: (i) the plurality of video frames, and (ii) the object localization data generated by the optical flow object localization system by processing the optical flow images corresponding to the plurality of video frames, training a second object localization system, e.g. a novel object localization system, to process a video frame to generate object localization data defining locations of objects depicted in the video frame.

The optical flow object localization system may be trained using: (i) optical flow images, and (ii) object localization data defining locations of objects depicted in video frames corresponding to optical flow images. The object localization data defining locations of objects depicted in a video frame corresponding to an optical flow image may be obtained by processing the video frame using a known object localization system, as previously described.

Thus the method may comprise using a known or trained object localization system, which may fail to detect (localize) certain objects, e.g. certain classes of object, and using this to provide object localization data for training an optical flow object localization system. The optical flow object localization system, which works on a different basis, namely optical flow, may learn to localize objects which the known/trained object localization system missed. Thus the optical flow object localization system may be used to generate training data which can be used to train a second object localization system e.g. to improve the known or trained object localization system e.g. by further training, and/or to train a "novel" object localization system (which is not based on optical flow).

Thus in some implementations training the novel object localization system comprises, for one or more of the plurality of video frames: processing the video frame using a known object localization system to generate object localization data defining locations of objects depicted in the video frame, wherein the known object localization system is trained to localize objects that are from a predetermined set of known object classes; identifying locations of novel objects depicted in the video frame, wherein the location of a novel object is: (i) included in the object localization data generated by the optical flow object localization system for the video frame, and (ii) not included in the object localization data generated by the known object localization system for the video frame; and training the novel object localization system to process the video frame to generate object localization data which comprises data defining the locations of the novel objects depicted in the video frame.

The novel object localization system may be trained to process the video frame to generate object localization data which comprises the object localization data generated by the known object localization system by processing the video frame, in addition to the data defining the locations of the novel objects depicted in the video frame.

The method may further comprise processing an image using the trained second object localization system to generate object localization data defining locations of objects depicted in the image, wherein the image is not a video frame. Thus once trained the second object localization system may be applied to any sort of image.

Particular embodiments of the subject matter described in this specification can be implemented so as to realize one or more of the following advantages.

This specification describes a training system that can train an object localization system (referred to in this specification as a "novel object localization system") to localize "novel" objects in images. A novel object in an image refers to an object that is missed (i.e., not localized) by an existing object localization system (referred to in this specification as a "known object localization system"). A novel object localization system can be used to improve the accuracy of the known object localization system by identifying where the known object localization system currently fails. In a particular example, novel objects localized by the novel object localization system can be used as training data to improve the accuracy of the known object localization system in localizing objects in images. This is a technical improvement in the field of image processing.

This specification also describes a training system that can train an object localization system (referred to in this specification as an "optical flow object localization system") to process an optical flow image to localize objects depicted in a video frame corresponding to the optical flow image. The optical flow object localization system trained in this manner can be used to generate training data for training the novel object localization system. Moreover, the training system can efficiently generate training data for training the optical flow object localization system by transferring object localization data from video frames to corresponding optical flow images. For example, the training system can process video frames using the known object localization system to generate object bounding boxes around objects depicted in the video frames, and transfer the generated object bounding boxes to optical flow images corresponding to the video frames. In this manner, the training system can automatically generate training data for the optical flow object localization system rather than requiring object localization data to be manually annotated on optical flow images, which is a time-consuming and difficult process. This is also a technical improvement in the field of image processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
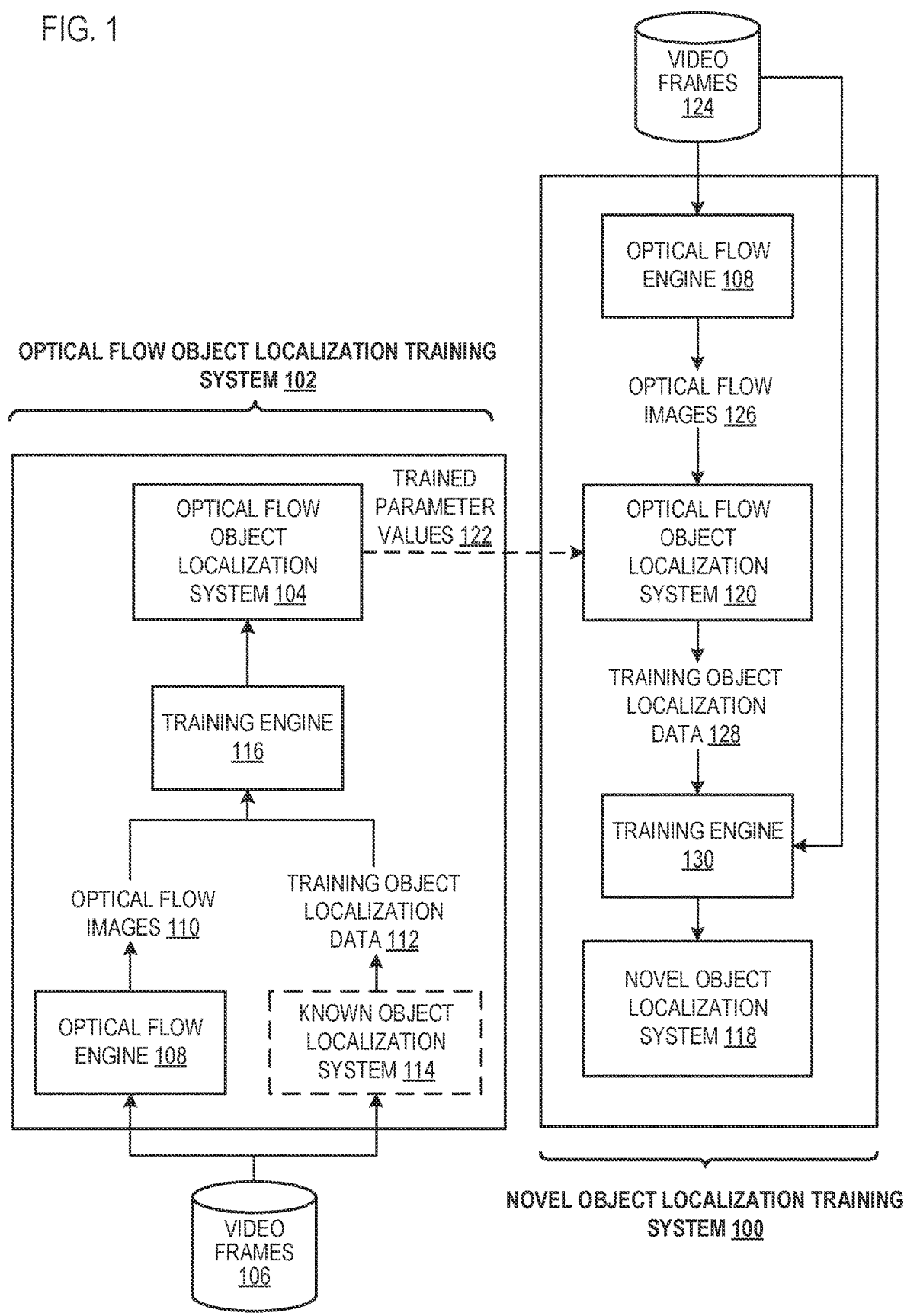
FIG. 1 is a block diagram of an example optical flow object localization training system and an example novel object localization training system.

An object localization system is a system having one or more trainable parameters (e.g., a neural network) that is configured to process an image (e.g., an RGB image) to localize (i.e., identify the locations of) objects depicted in the image. An object localization system can be trained using a set of training examples, where each training example includes: (i) a training image, and (ii) training object localization data defining the locations of objects depicted in the training image. This specification describes a method for training a "novel" object localization system to localize objects that are currently missed (i.e., not localized) by a "known" object localization system. In some cases, the known object localization system may fail to localize an object because the object is rare or unusual (e.g., a space shuttle) and doesn't fit into any of a predetermined set of object categories the known object localization system is trained to localize. In some other cases, the known object localization system may fail to localize an object in an image if the object has a different visual appearance in the image than it does in the training images used to train the known object localization system. For example, the known object localization system may fail to localize a cat which is depicted in an image from a top-down perspective if the training images used to train the known object localization system all depict cats from a head-on perspective. Objects that are missed by the known object localization system are referred to in this specification as "novel objects".

The novel object localization system is trained to localize novel objects using training data generated by an optical flow object localization system. The optical flow object localization system is trained to process optical flow images which correspond to video frames of videos to localize objects depicted in the video frames. An optical flow image corresponding to a video frame describes the movement, but not the visual appearance (e.g., color, texture, and the like), of objects depicted in the video frame. Therefore, the optical flow object localization system localizes objects based on their movement rather than relying on their visual appearance.

The optical flow object localization system generates training data for the novel object localization system by processing optical flow images corresponding to training video frames to localize objects depicted in the training video frames based on their movement. Objects depicted in the training video frames which are: (i) localized by the optical flow object localization system, and (ii) not localized by the known object localization system, can be identified as novel objects. That is, an object may be identified as a novel object if it is localized by the optical flow object localization system based on its movement but is not localized by the known object localization system based on its visual appearance. The novel object localization system can be trained to process the training video frames to localize the identified novel objects depicted in the training video frames. After training, the novel object localization system can process images which include, but are not restricted to, video frames.

The optical flow object localization system is trained using: (i) optical flow images corresponding to video frames, and (ii) training object localization data indicating the locations of objects depicted in the video frames. In some cases, the training object localization data may be generated by a person manually annotating the locations of the objects depicted in the video frames. In some other cases, the training object localization data may be generated by processing the video frames using the known object localization system. The optical flow object localization system is trained to process the optical flow images corresponding to the video frames to localize the objects depicted in the video frames (i.e., as specified by the training object localization data).

These features and other features are described in more detail below.

FIG. 1 is a block diagram of an example novel object localization training system 100 and an example optical flow object localization training system 102. The systems 100 and 102 are examples of systems implemented as computer programs on one or more computers in one or more locations in which the systems, components, and techniques described below are implemented.

To train the optical flow object localization system 104, the system 102 obtains sequences of video frames 106 from one or more videos. Each of the video frames 106 is an image that can be represented as a two-dimensional (2D) array of pixels, where each pixel is represented as a vector of one or more values. For example, if the video frames are black-and-white images, each pixel can be represented as an integer or floating point number (i.e., a vector with one component) representing the brightness of the pixel. As another example, if the video frames are red-green-blue (RGB) images, each pixel can be represented as a vector with three integer or floating point components, which respectively represent the intensity of the red, green, and blue color of the pixel. In some other examples YUV or HSV color channels may be employed. The pixels of a video frame can be indexed by (x,y) coordinates, where x and y are integer values.

The system 102 processes the video frames 106 from each video using an optical flow engine 108 to generate a respective optical flow image 110 corresponding to each video frame 106. The optical flow image corresponding to a video frame in a video characterizes the displacement of each pixel of the video frame between the video frame and a subsequent video frame in the video. The displacement of a pixel from a video frame to a subsequent video frame can be represented as a vector with two numerical (e.g., integer or floating point) components, with the first component representing the x-displacement of the pixel and the second component representing the y-displacement of the pixel. The optical flow image corresponding to a video frame can be represented as a 2D array of displacements which are indexed by the same (x,y) coordinates as the video frame. That is, a displacement at a particular (x,y) coordinate in an optical flow image represents the displacement of the pixel at the same (x,y) coordinate in the corresponding video frame. The optical flow image 110 corresponding to a video frame 106 from a video describes the movement, but not the visual appearance (e.g., color, texture, and the like) of objects depicted in the video frame 106.

The system 102 obtains training object localization data 112 for each of the video frames 106. The training object localization data 112 for a video frame defines the locations of objects depicted in the video frame. For example, the training object localization data 112 for a video frame 106 may define the locations of objects depicted in the video frame 106 by data defining the coordinates of bounding boxes around objects depicted in the video frame 106. As another example, the training object localization data 112 for a video frame 106 may define the locations of objects depicted in the video frame 106 by data defining segmentations of objects depicted in the video frame 106. The segmentation of an object depicted in a video frame can be represented as a list of the (x,y) coordinates of the pixels in the video frame which are included in the object.

In some implementations, the system 102 obtains the training object localization data 112 for a video frame 106 by processing the video frame 106 using the known object localization system 114. As described earlier, the known object localization system 114 is trained to process images to localize objects depicted in the images. In some other implementations, the system 102 obtains the training object localization data 112 for a video frame 106 by accessing (i.e., from a data store) object localization data that has been manually generated by a person for the video frame 106.

The system 102 uses a training engine 116 to train the optical flow object localization system 104 using: (i) the optical flow images 110, and (ii) the training object localization data 112. The optical flow object localization system 104 is configured to process an optical flow image derived from a video frame to generate object localization data which defines the locations of objects depicted in the video frame. The training engine 116 trains the optical flow object localization system 104 to process each optical flow image 110 to generate object localization data which matches the training object localization data 112 corresponding to the optical flow image 110. An optical flow image corresponding to a video frame describes the movement, but not the visual appearance (e.g., color, texture, and the like), of objects depicted in the video frame. Therefore, the optical flow object localization system 104 localizes objects based on their movement rather than relying on their visual appearance.

The training engine 116 may be configured to train the optical flow object localization system 104 using any appropriate machine learning training technique (e.g., stochastic gradient descent). For example, the training engine 116 may be configured to train the optical flow object localization system 104 by iteratively (i.e., at each of multiple training iterations) adjusting the current parameter values of the optical flow object localization system 104. An example process for training an optical flow object localization system 104 is described further with reference to FIG. 3.

The novel object localization training system 100 is configured to train the novel object localization system 118 to process images (e.g., video frames) to generate object localization data defining the locations of novel objects depicted in the images (i.e., objects that are missed by the known object localization system 114). As will be described in more detail below, the system 100 trains the novel object localization system 118 using an optical flow object localization system 120. The system 100 may set the parameter values of the optical flow object localization system 120 to be the trained parameter values 122 of the optical flow object localization system 104 trained by the system 102.

To train the novel object localization system 118, the system 100 obtains sequences of video frames 124 from one or more videos (which may be the same as the video frames 106 used in training the optical flow object localization system 104). The system 100 processes the video frames 124 from each video using the optical flow engine 108 to generate a respective optical flow image 126 corresponding to each video frame 124. The system 100 processes each of the optical flow images 126 using the optical flow object localization system 120 to generate training object localization data 128 which defines the locations of objects depicted in the video frames 124. Since the optical flow object localization system 120 localizes objects based on their movement rather than relying on their visual appearance, the object localization training data 128 can identify novel objects in the absence of training data from the original source characterizing their visual appearance (e.g., color, texture, and the like).

The system 100 uses a training engine 130 to train the novel object localization system 118 to localize novel objects using: (i) the video frames 124, and (ii) the training object localization data 128 generated by the optical flow object localization system 120. For example, to identify novel objects depicted in the video frames 124, the system 100 may first process the video frames 124 using the known object localization system 114. Then, the system 100 may identify an object as a novel object if it is: (i) included in the training object localization data 128 generated by the optical flow object localization system 120, and (ii) not included in the object localization data generated by the known object localization system 114. That is, the system 100 may identify an object as a novel object if it localized by the optical flow object localization system 120 based on its movement but not localized by the known object localization system 114 based on its visual appearance. In this example, the training engine 130 can train the novel object localization system 118 to process each video frame 124 to generate object localization data which includes the novel objects identified by the system 100 in the video frame 124. In some cases, as will be described in more detail with reference to FIG. 4, the system can train the novel object localization system 118 to generate object localization data which additionally includes the object localization data generated by the known object localization system 114 for the video frame.

The training engine 130 may be configured to train the novel object localization system 118 using any appropriate machine learning training technique (e.g., stochastic gradient descent). For example, the training engine 130 may be configured to train the novel object localization system 118 by iteratively (i.e., at each of multiple training iterations) adjusting the current parameter values of the novel object localization system 118. An example process for training a novel object localization system 118 is described further with reference to FIG. 4.

The novel object localization system 118 trained by the system 100 is not restricted to processing video frames. In particular, after being trained, the novel object localization system 118 can process any images (including, but not restricted to, video frames) to localize novel objects depicted in the images.

Figure 2:
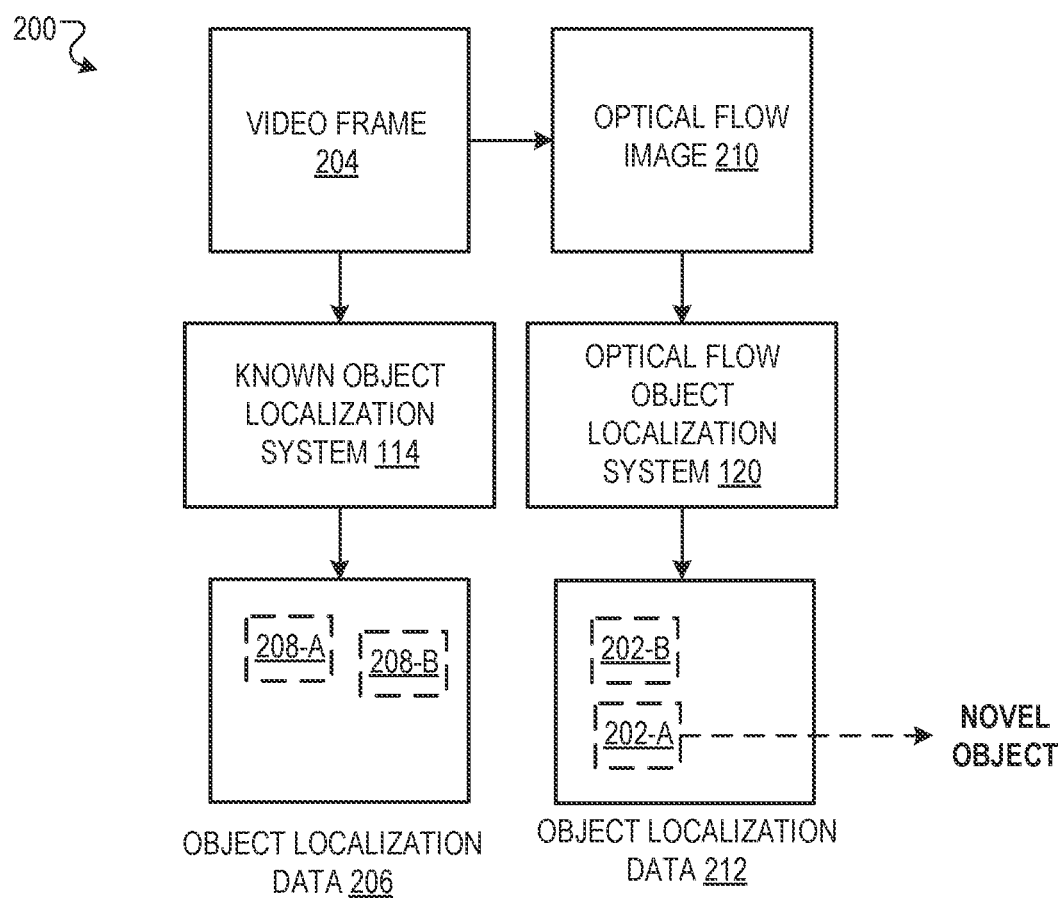
FIG. 2 is an example data flow for localizing a novel object in a video frame using a known object localization system and an optical flow object localization system.

FIG. 2 is an example data flow 200 for identifying a novel object 202-A in a video frame 204 using a known object localization system 114 and an optical flow object localization system 120. The known object localization system 114 processes the video frame 204 to generate object localization data 206 which defines the locations of objects 208-A and 208-B. The optical flow object localization system 120 processes the optical flow image 210 corresponding to the video frame 204 to generate object localization data 212 which defines the locations of objects 202-A and 202-B. Object 202-A can be identified as a novel object since it is localized by the optical flow object localization system 120 but not the known object localization system 114. Object 208-B is localized by the known object localization system 114 but not the optical flow object localization system 120, potentially because object 208-B is a stationary object that cannot be reliably localized from the optical flow image 210 (as will be described in more detail below).

Figure 3:
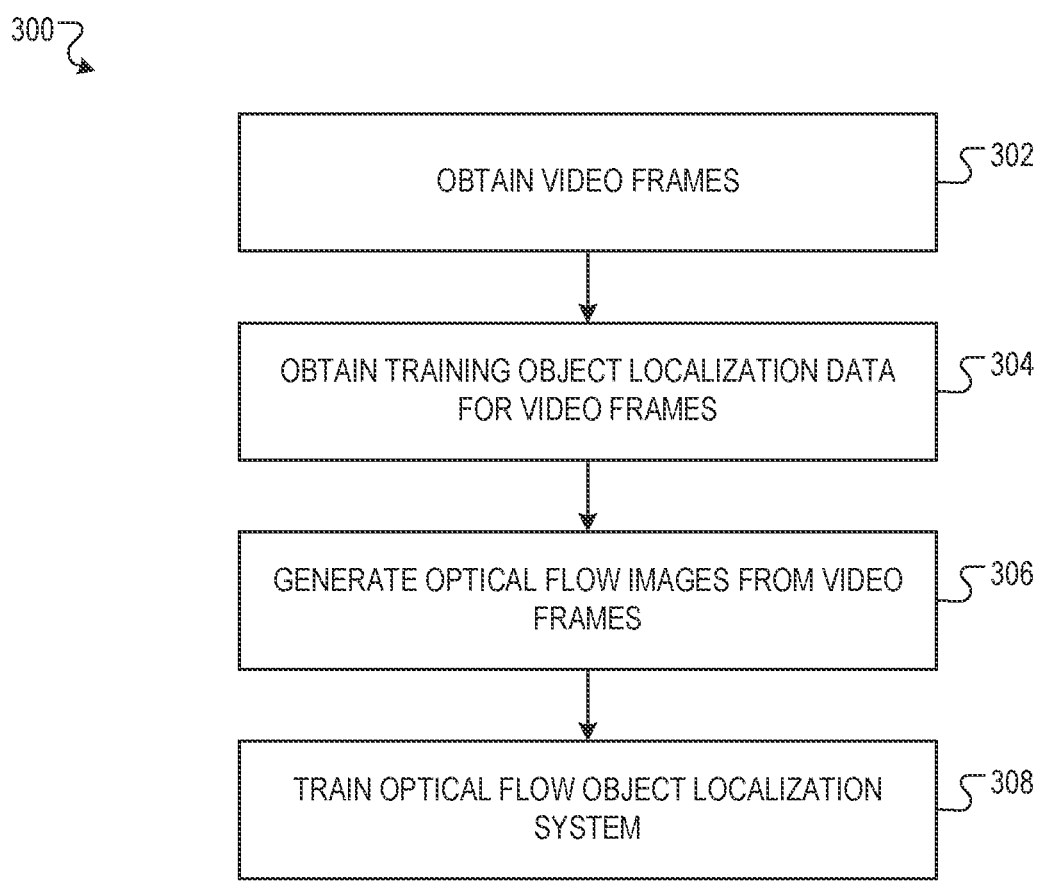
FIG. 3 is a flow diagram of an example process for training an optical flow object localization system.

FIG. 3 is a flow diagram of an example process 300 for training an optical flow object localization system. For convenience, the process 300 will be described as being performed by a system of one or more computers located in one or more locations. For example, an optical flow object localization training system, e.g., the optical flow object localization training system 102 of FIG. 1, appropriately programmed in accordance with this specification, can perform the process 300.

The system obtains respective sequences of video frames from one or more videos (302). The videos may be captured by digital video cameras or may be computer-generated. Each of the video frames is an image that can be represented as a 2D array of pixels, where each pixel is represented as a vector of one or more color values (e.g., RGB color values).

The system obtains respective training object localization data for each of the video frames (304). The training object localization data for a video frame defines the locations of objects depicted in the video frame. For example, the training object localization data for a video frame may define the locations of the objects depicted in the video frame by data defining the coordinates of respective bounding boxes around objects depicted in the video frame. As another example, the training object localization data for a video frame may define the locations of objects depicted in the video frame by data defining respective segmentations of objects depicted in the video frame. In some implementations, the system obtains the training object localization data for a video frame by processing the video frame using the known object localization system. The known object localization system may be configured to process a video frame in accordance with trained values of known object localization system parameters to generate the object localization data for the video frame. In some other implementations, the system can obtain training object localization data for a video frame which is manually annotated by a person.

The system generates a respective optical flow image corresponding to each of the video frames (306). The system can generate the optical flow image corresponding to a video frame using any appropriate method. For example, the system can process a video frame from a video and a video frame subsequent to the video frame in the video using a direct numerical optimization method (e.g., the Lucas-Kanade method) to generate the optical flow image corresponding to the video frame. Thus a direct numerical optimization method may be a method in which an optical flow defined, for example, by a flow velocity vector, is fitted to flow data defined by the video frames by a direct numerical optimization method. For example in the Lucas-Kanade method a locally constant velocity is assumed. More generally a differential technique may be employed to determine optical flow based on local and/or global first and optionally second derivatives of pixel values with respect to time and/or x- and y-displacement.

As another example, the system can process a video frame from a video and a video frame subsequent to the video frame in the video using a neural network that is configured to generate an output defining the optical flow image corresponding to the video frame.

An optical flow image may comprise, for example a set of x- and y-pixel displacement values for each pixel location. Alternatively, for example, it may comprise x- and y-components of a vector mapping motion of a pixel from one frame to one or more later frames. The optical flow may be unidirectional, either forwards or backwards, or bi-directional. Optionally a global, e.g. mean, motion estimation component may be subtracted to compensate for camera/sensor motion.

The system trains an optical flow object localization system using: (i) the optical flow images, and (ii) the training object localization data defining the locations of objects depicted in the video frames corresponding to the optical flow images (308). More specifically, the system trains the optical flow object localization system to process each optical flow image to generate object localization data which matches the training object localization data defining the locations of objects depicted in the video frame corresponding to the optical flow image. The system can train the optical flow object localization system by iteratively adjusting the parameter values of the optical flow object localization system over multiple iterations using a machine learning training technique (e.g., stochastic gradient descent). In some cases, the optical flow object localization system can be implemented as a neural network. An example of an object localization neural network, and a method for training an object localization neural network, is described with reference to: S. Ren, K. He, R. Girshick, and J. Sun, "Faster R-CNN: towards real-time object localization with region proposal networks", Advances in Neural Information Processing Systems (NIPS), 2015. Any other appropriate implementation of an object localization system can also be used.

In some cases, the training object localization data may define the location of an object in a video frame which the optical flow object localization system will be unable to reliably localize from the optical flow image corresponding to the video frame. For example, the optical flow object localization system may be unable to reliably localize an object depicted in a video frame which is stationary (i.e., not moving) relative to the background depicted in the video frame. In this example, the portion of an optical flow image corresponding to a stationary object will not distinctively characterize the stationary object, because the displacement vectors in that portion of the optical flow image may all be approximately zero (or some other constant value). The system may modify the training object localization data used to train the optical flow object localization system by removing data defining the locations of objects which the optical flow object localization system will be unable to reliably localize from the optical flow images.

To determine if the optical flow object localization system will be unable to reliably localize an object specified by the training object localization data, the system can determine the variance of the portion of the optical flow image characterizing the object. If the variance does not satisfy a predetermined (minimum) threshold, the system may determine that the optical flow object localization system will be unable to reliably localize the object, and thereafter refrain from training the optical flow object localization system to localize the object.

Figure 4:
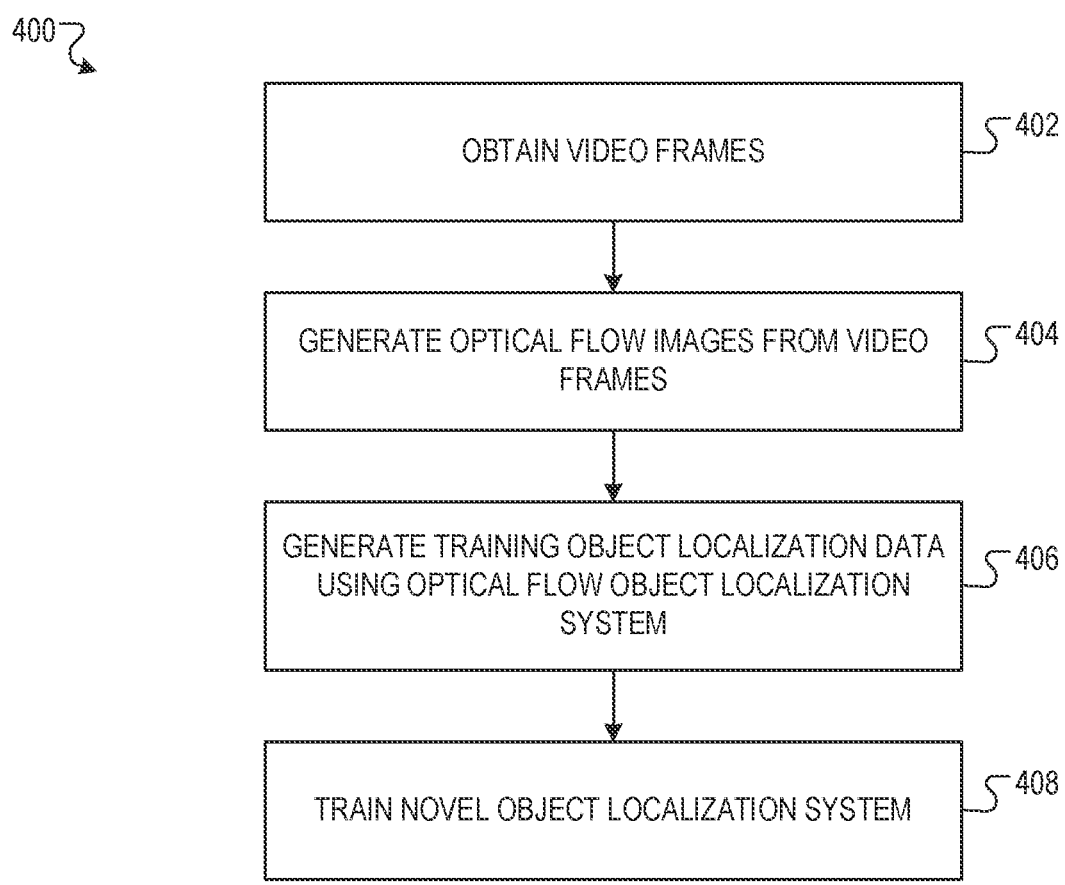
FIG. 4 is a flow diagram of an example process for training a novel object localization system.

FIG. 4 is a flow diagram of an example process 400 for training a novel object localization system. For convenience, the process 400 will be described as being performed by a system of one or more computers located in one or more locations. For example, a novel object localization training system, e.g., the novel object localization training system 100 of FIG. 1, appropriately programmed in accordance with this specification, can perform the process 400.

The system obtains respective sequences of video frames from one or more videos (402). The videos may be captured by digital video cameras or may be computer-generated. Each of the video frames is an image that can be represented as a 2D array of pixels, where each pixel is represented as a vector of one or more color values (e.g., RGB color values). In some cases, the obtained video frames may be the same video frames used to train the optical flow object localization system (as described with reference to FIG. 3).

The system generates a respective optical flow image corresponding to each of the video frames (404). The system can generate the optical flow image corresponding to a video frame using any appropriate method. A few example methods for generating an optical flow image corresponding to a video frame are described with reference to 306.

The system processes each of the optical flow images using a trained optical flow object localization system to generate respective training object localization data defining the locations of objects depicted in the video frames corresponding to the optical flow images (406). The optical flow object localization system may be trained, for example, by the process 300 described with reference to FIG. 3. The training object localization data generated by the optical flow object localization system for an optical flow image may be, for example, data defining respective bounding box coordinates around objects depicted in the video frame, or respective segmentations of objects depicted in the video frame.

The system trains the novel object localization system using: (i) the video frames, and (ii) the training object localization data generated by the optical flow object localization system by processing the optical flow images corresponding to the video frames (408). For example, to identify novel objects depicted in the video frames, the system may first process the video frames using the known object localization system. Then, the system may identify an object as a novel object if it is: (i) included in the training object localization data generated by the optical flow object localization system, and (ii) not included in the object localization data generated by the known object localization system. That is, the system may identify an object as a novel object if it is localized by the optical flow object localization system based on its movement but not localized by the known object localization system based on its visual appearance. In this example, the system can train the novel object localization system to process each video frame to generate object localization data which includes the novel objects identified by the system in the video frame.

In some implementations, the system may train the novel object localization system to process each video frame to generate object localization data which includes both: (i) the novel objects identified by the system in the video frame, and (ii) the objects localized by the known object localization system in the video frame. The system may further train the novel object localization system to process each video frame to generate respective object class labels for objects depicted in the video frame. In these implementations, the system may initialize the parameter values of the novel object localization system with the parameter values of the known object localization system.

The system may be configured to train the novel object localization system using any appropriate machine learning training technique (e.g., stochastic gradient descent). For example, the system may be configured to train the novel object localization system by iteratively (i.e., at each of multiple training iterations) adjusting the current parameter values of the novel object localization system. For example, the novel object localization system can be implemented as a neural network. An example of an object localization neural network, and a method for training an object localization neural network, is described with reference to: S. Ren, K. He, R. Girshick, and J. Sun, "Faster R-CNN: towards real-time object localization with region proposal networks", Advances in Neural Information Processing Systems (NIPS), 2015. Any other appropriate implementation of an object localization system can also be used.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

In a first aspect, there is provided a method performed by one or more data processing apparatus, the method comprising: for each video frame of a video comprising a plurality of video frames, obtaining object localization data defining locations of objects depicted in the video frame; processing the video to generate, for each video frame of the plurality of video frames, a corresponding optical flow image characterizing a displacement of each pixel of the video frame between the video frame and a subsequent video frame in the video; and using: (i) the optical flow images, and (ii) the object localization data defining the locations of objects depicted in the plurality of video frames corresponding to the optical flow images, training an optical flow object localization system to process an optical flow image to generate object localization data defining locations of objects depicted in a video frame corresponding to the optical flow image.

In combination with any of the previous aspects, in some implementations, obtaining object localization data defining locations of objects depicted in the video frame comprises processing the video frame using a known object localization system, wherein the known object localization system is configured to process the video frame to generate data defining locations of objects depicted in the video frame that are from a predetermined set of object classes.

In combination with any of the previous aspects, in some implementations the known object localization system comprises a neural network.

In combination with any of the previous aspects, in some implementations obtaining object localization data defining locations of objects depicted in the video frame comprises obtaining object localization data defining locations of objects depicted in the video frame which is manually annotated by a person.

In combination with any of the previous aspects, in some implementations the object localization data defining locations of objects depicted in the video frame comprises data defining bounding boxes around locations of objects depicted in the video frame.

In combination with any of the previous aspects, in some implementations processing the video to generate, for each video frame of the plurality of video frames, a corresponding optical flow image comprises processing the video using a direct numerical optimization method to generate, for each video frame of the plurality of video frames, the corresponding optical flow image.

In combination with any of the previous aspects, in some implementations the method further comprises, for each optical flow image: for each object location defined by the object localization data for the video frame corresponding to the optical flow image, determining a respective variance of optical flow data in the optical flow image at the object location; and modifying the object localization data used to train the optical flow object localization system by removing data defining object locations where the variance of the optical flow data in the optical flow image at the object location does not satisfy a threshold.

In combination with any of the previous aspects, in some implementations the optical flow object localization system comprises a neural network.

In another aspect, there is provided a method performed by one or more data processing apparatus, the method comprising processing a video comprising a plurality of video frames to generate, for each video frame of the plurality of video frames, a corresponding optical flow image characterizing a displacement of each pixel of the video frame between the video frame and a subsequent video frame in the video; for each optical flow image, processing the optical flow image using an optical flow object localization system to generate object localization data defining locations of objects depicted in the video frame corresponding to the optical flow image; and using: (i) the plurality of video frames, and (ii) the object localization data generated by the optical flow object localization system by processing the optical flow images corresponding to the plurality of video frames, training a novel object localization system to process a video frame to generate object localization data defining locations of objects depicted in the video frame.

In combination with any of the previous aspects, in some implementations processing the video to generate, for each video frame of the plurality of video frames, a corresponding optical flow image comprises: processing the video using a direct numerical optimization method to generate, for each video frame of the plurality of video frames, the corresponding optical flow image.

In combination with any of the previous aspects, in some implementations the optical flow object localization system is trained using: (i) optical flow images, and (ii) object localization data defining locations of objects depicted in video frames corresponding to optical flow images.

In combination with any of the previous aspects, in some implementations the object localization data defining locations of objects depicted in a video frame corresponding to an optical flow image is obtained by processing the video frame using a known object localization system, wherein the known object localization system is configured to process the video frame to generate data defining locations of objects depicted in the video frame that are from a predetermined set of object classes.

In combination with any of the previous aspects, in some implementations the known object localization system comprises a neural network.

In combination with any of the previous aspects, in some implementations the object localization data defining locations of objects depicted in the video frame corresponding to the optical flow image comprises: data defining bounding boxes in the optical flow image around locations of objects depicted in the video frame corresponding to the optical flow image.

In combination with any of the previous aspects, in some implementations training the novel object localization system comprises, for one or more of the plurality of video frames: processing the video frame using a known object localization system to generate object localization data defining locations of objects depicted in the video frame, wherein the known object localization system is trained to localize objects that are from a predetermined set of known object classes; identifying locations of novel objects depicted in the video frame, wherein the location of a novel object is: (i) included in the object localization data generated by the optical flow object localization system for the video frame, and (ii) not included in the object localization data generated by the known object localization system for the video frame; and training the novel object localization system to process the video frame to generate object localization data which comprises data defining the locations of the novel objects depicted in the video frame.

In combination with any of the previous aspects, in some implementations the method further comprises training the novel object localization system to process the video frame to generate object localization data which comprises the object localization data generated by the known object localization system by processing the video frame, in addition to the data defining the locations of the novel objects depicted in the video frame.

In combination with any of the previous aspects, in some implementations, the method further comprises processing an image using the trained novel object localization system to generate object localization data defining locations of objects depicted in the image, wherein the image is not a video frame.

In combination with any of the previous aspects, in some implementations the novel object localization system comprises a neural network.

What is claimed is:

1. A method performed by one or more data processing apparatus, the method comprising:
   processing a video comprising a plurality of video frames to generate, for each video frame of the plurality of video frames, a corresponding optical flow image characterizing a displacement of each pixel of the video frame between the video frame and a subsequent video frame in the video;
   for each optical flow image, processing the optical flow image using an optical flow object localization system to generate object localization data defining locations of objects depicted in the video frame corresponding to the optical flow image; and
   using: (i) the plurality of video frames, and (ii) the object localization data generated by the optical flow object localization system by processing the optical flow images corresponding to the plurality of video frames, training a visual object localization system to process a video frame to generate object localization data defining locations of objects depicted in the video frame, wherein training the visual object localization system comprises, for one or more of the plurality of video frames:

determining target object localization data for the video frame based on the object localization data generated by processing the optical flow image corresponding to the video frame using the optical flow object localization system; and training the visual object localization system to process the video frame to generate object localization data for the video frame that matches the target object localization data for the video frame.

2. The method of claim 1, wherein determining the target object localization data for the video frame based on the object localization data generated by processing the optical flow image corresponding to the video frame using the optical flow object localization system comprises:

processing the video frame using a known object localization system to generate object localization data defining locations of objects depicted in the video frame, wherein the known object localization system is trained to localize objects that are from a predetermined set of known object classes;

identifying locations of novel objects depicted in the video frame, wherein the location of a novel object is: (i) included in the object localization data generated by the optical flow object localization system for the video frame, and (ii) not included in the object localization data generated by the known object localization system for the video frame; and including data defining the locations of the novel objects in the target object localization data.

3. The method of claim 1, wherein the target object localization data includes the object localization data generated by processing the optical flow image corresponding to the video frame using the optical flow object localization system.

4. The method of claim 1, wherein processing the video to generate, for each video frame of the plurality of video frames, a corresponding optical flow image comprises:

processing the video using a direct numerical optimization method to generate, for each video frame of the plurality of video frames, the corresponding optical flow image.

5. The method of claim 1, wherein the optical flow object localization system is trained using: (i) optical flow images, and (ii) object localization data defining locations of objects depicted in video frames corresponding to optical flow images.

6. The method of claim 5, wherein the object localization data defining locations of objects depicted in a video frame corresponding to an optical flow image is obtained by processing the video frame using a known object localization system, wherein the known object localization system is configured to process the video frame to generate data defining locations of objects depicted in the video frame that are from a predetermined set of object classes.

7. The method of claim 6, wherein the known object localization system comprises a neural network.

8. The method of claim 1, wherein the object localization data defining locations of objects depicted in the video frame corresponding to the optical flow image comprises: data defining bounding boxes in the optical flow image around locations of objects depicted in the video frame corresponding to the optical flow image.

9. The method of claim 1, further comprising:

processing an image using the trained visual object localization system to generate object localization data defining locations of objects depicted in the image, wherein the image is not a video frame.

10. The method of claim 1, wherein the visual object localization system comprises a neural network.

11. A system comprising:

one or more computers; and one or more storage devices communicatively coupled to the one or more computers, wherein the one or more storage devices store instructions that, when executed by the one or more computers, cause the one or more computers to perform operations comprising:

processing a video comprising a plurality of video frames to generate, for each video frame of the plurality of video frames, a corresponding optical flow image characterizing a displacement of each pixel of the video frame between the video frame and a subsequent video frame in the video;

for each optical flow image, processing the optical flow image using an optical flow object localization system to generate object localization data defining locations of objects depicted in the video frame corresponding to the optical flow image; and using: (i) the plurality of video frames, and (ii) the object localization data generated by the optical flow object localization system by processing the optical flow images corresponding to the plurality of video frames, training a visual object localization system to process a video frame to generate object localization data defining locations of objects depicted in the video frame, wherein training the visual object localization system comprises, for one or more of the plurality of video frames:

determining target object localization data for the video frame based on the object localization data generated by processing the optical flow image corresponding to the video frame using the optical flow object localization system; and training the visual object localization system to process the video frame to generate object localization data for the video frame that matches the target object localization data for the video frame.

12. The system of claim 11, wherein determining the target object localization data for the video frame based on the object localization data generated by processing the optical flow image corresponding to the video frame using the optical flow object localization system comprises:

processing the video frame using a known object localization system to generate object localization data defining locations of objects depicted in the video frame, wherein the known object localization system is trained to localize objects that are from a predetermined set of known object classes;

identifying locations of novel objects depicted in the video frame, wherein the location of a novel object is: (i) included in the object localization data generated by the optical flow object localization system for the video frame, and (ii) not included in the object localization data generated by the known object localization system for the video frame; and including data defining the locations of the novel objects in the target object localization data.

13. The system of claim 11, wherein the target object localization data includes the object localization data generated by processing the optical flow image corresponding to the video frame using the optical flow object localization system.

14. The system of claim 11, wherein processing the video to generate, for each video frame of the plurality of video frames, a corresponding optical flow image comprises:
  processing the video using a direct numerical optimization method to generate, for each video frame of the plurality of video frames, the corresponding optical flow image.

15. One or more non-transitory computer storage media storing instructions that when executed by one or more computers cause the one or more computers to perform operations comprising:
  processing a video comprising a plurality of video frames to generate, for each video frame of the plurality of video frames, a corresponding optical flow image characterizing a displacement of each pixel of the video frame between the video frame and a subsequent video frame in the video;
  for each optical flow image, processing the optical flow image using an optical flow object localization system to generate object localization data defining locations of objects depicted in the video frame corresponding to the optical flow image; and
  using: (i) the plurality of video frames, and (ii) the object localization data generated by the optical flow object localization system by processing the optical flow images corresponding to the plurality of video frames, training a visual object localization system to process a video frame to generate object localization data defining locations of objects depicted in the video frame, wherein training the visual object localization system comprises, for one or more of the plurality of video frames:
    determining target object localization data for the video frame based on the object localization data generated by processing the optical flow image corresponding to the video frame using the optical flow object localization system; and
    training the visual object localization system to process the video frame to generate object localization data for the video frame that matches the target object localization data for the video frame.

16. The non-transitory computer storage media of claim 15, wherein determining the target object localization data for the video frame based on the object localization data generated by processing the optical flow image corresponding to the video frame using the optical flow object localization system comprises:
  processing the video frame using a known object localization system to generate object localization data defining locations of objects depicted in the video frame, wherein the known object localization system is trained to localize objects that are from a predetermined set of known object classes;
  identifying locations of novel objects depicted in the video frame, wherein the location of a novel object is: (i) included in the object localization data generated by the optical flow object localization system for the video frame, and (ii) not included in the object localization data generated by the known object localization system for the video frame; and
  including data defining the locations of the novel objects in the target object localization data.

17. The non-transitory computer storage media of claim 15, wherein the target object localization data includes the object localization data generated by processing the optical flow image corresponding to the video frame using the optical flow object localization system.

18. The non-transitory computer storage media of claim 15, wherein processing the video to generate, for each video frame of the plurality of video frames, a corresponding optical flow image comprises:
  processing the video using a direct numerical optimization method to generate, for each video frame of the plurality of video frames, the corresponding optical flow image.

19. The non-transitory computer storage media of claim 15, wherein the optical flow object localization system is trained using: (i) optical flow images, and (ii) object localization data defining locations of objects depicted in video frames corresponding to optical flow images.

20. The non-transitory computer storage media of claim 19, wherein the object localization data defining locations of objects depicted in a video frame corresponding to an optical flow image is obtained by processing the video frame using a known object localization system, wherein the known object localization system is configured to process the video frame to generate data defining locations of objects depicted in the video frame that are from a predetermined set of object classes.

* * * * *